US010834355B2

United States Patent
Cao et al.

(10) Patent No.: US 10,834,355 B2
(45) Date of Patent: Nov. 10, 2020

(54) BARRAGE MESSAGE PROCESSING

(71) Applicant: International Business Machines Corporation, Armonk, NY (US)

(72) Inventors: Xiao Cao Cao, Shanghai (CN); Yu Huang, Shanghai (CN); Yuan Jin, Shanghai (CN); Chengyu Peng, Shanghai (CN); Yin Qian, Shanghai (CN); Xiao Rui Shao, Shanghai (CN); Jian Jun Wang, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/362,926

(22) Filed: Mar. 25, 2019

(65) Prior Publication Data

US 2019/0222792 A1 Jul. 18, 2019

Related U.S. Application Data

(63) Continuation of application No. 15/397,831, filed on Jan. 4, 2017, now Pat. No. 10,284,806.

(51) Int. Cl.
*H04N 5/445* (2011.01)
*H04N 21/4788* (2011.01)
(Continued)

(52) U.S. Cl.
CPC ..... *H04N 5/44504* (2013.01); *G06K 9/00369* (2013.01); *G06K 9/00671* (2013.01); *G06K 9/00718* (2013.01); *G06K 9/00744* (2013.01); *H04N 21/23418* (2013.01); *H04N 21/25891* (2013.01); *H04N 21/4316* (2013.01); *H04N 21/454* (2013.01); *H04N 21/4788* (2013.01); *H04N 21/4882* (2013.01); *H04N 21/84* (2013.01); *G06K 9/00597* (2013.01)

(58) Field of Classification Search
None
See application file for complete search history.

(56) References Cited

U.S. PATENT DOCUMENTS

| 2010/0179991 A1 | 7/2010 | Lorch et al. |
| 2012/0056898 A1 | 3/2012 | Tsurumi et al. |

(Continued)

FOREIGN PATENT DOCUMENTS

| CN | 104504063 A | 4/2015 |
| CN | 104636434 A | 5/2015 |

(Continued)

OTHER PUBLICATIONS

Kanghong Lu, "User Comments to Video Instructions: the Effects of Kanmaku on Usability, Motivation and Self-Efficacy", 2015, 42 pages.

(Continued)

*Primary Examiner* — Samira Monshi
(74) *Attorney, Agent, or Firm* — Nicholas D. Bowman; Hunter E. Webb; Keohane & D'Alessandro, PLLC

(57) ABSTRACT

Approaches presented herein enable displaying a barrage message. Specifically, one or more objects and location information for each object in a frame of a video are identified. A barrage message to be displayed in the frame of the video is obtained. The barrage message is displayed without covering any object in the frame.

17 Claims, 7 Drawing Sheets

(51) Int. Cl.
*H04N 21/488* (2011.01)
*H04N 21/431* (2011.01)
*G06K 9/00* (2006.01)
*H04N 21/454* (2011.01)
*H04N 21/84* (2011.01)
*H04N 21/234* (2011.01)
*H04N 21/258* (2011.01)

(56) References Cited

U.S. PATENT DOCUMENTS

| | | |
|---|---|---|
| 2013/0024775 A1 | 1/2013 | Miyazaki |
| 2013/0311169 A1 | 11/2013 | Khan |
| 2014/0168056 A1* | 6/2014 | Swaminathan .... G06K 9/00604 345/156 |
| 2014/0215512 A1 | 7/2014 | Maruyama et al. |
| 2015/0156147 A1 | 6/2015 | Liu |
| 2016/0112750 A1 | 4/2016 | Hager, IV |
| 2017/0063767 A1* | 3/2017 | Lukas .................... H04L 51/22 |
| 2017/0332125 A1 | 11/2017 | Panchaksharaiah et al. |
| 2018/0191987 A1 | 7/2018 | Cao et al. |

FOREIGN PATENT DOCUMENTS

| | | |
|---|---|---|
| CN | 104935997 A | 9/2015 |
| CN | 105187933 A | 12/2015 |
| CN | 105357586 A | 2/2016 |

OTHER PUBLICATIONS

Samira Monshi, USPTO Office Action, U.S. Appl. No. 15/397,831, dated May 5, 2017, 23 pages.
Samira Monshi, USPTO Final Office Action, U.S. Appl. No. 15/397,831, dated Dec. 1, 2017, 23 pages.
Samira Monshi, USPTO Office Action, U.S. Appl. No. 15/397,831, dated Mar. 21, 2018, 28 pages.
Samira Monshi, USPTO Final Office Action, U.S. Appl. No. 15/397,831, dated Sep. 12, 2018, 23 pages.
Samira Monshi, USPTO Notice of Allowance and Fees Due, U.S. Appl. No. 15/397,831, dated Dec. 26, 2018, 7 pages.

* cited by examiner

ACTOR LIST

ACTOR NAME : RACHAEL LI
CHARACTER NAME : CAROL

ACTOR NAME : ANGELA HU
CHARACTER NAME : LILY

ACTOR NAME : JOAN DONG
CHARACTER NAME : VIVIAN

BARRAGE MESSAGE PROCESSING

CROSS-REFERENCE TO RELATED APPLICATIONS

The present patent document is a continuation of U.S. patent application Ser. No. 15/397,831, filed Jan. 4, 2017, entitled "BARRAGE MESSAGE PROCESSING", the disclosure of which is incorporated herein by reference.

TECHNICAL FIELD

This invention relates generally to the field of network video technology, and more specifically, to barrage message processing.

BACKGROUND

With the rapid development of video technology and computer technology, barrage (also called bullet screen) messaging is widely used in the field of network video as a new way of browsing video. A user can use a barrage messaging function to submit comments which may be shown on the video screen, so that the user may watch other users' comments when he/she watches the video. In this case, the user may share his/her feelings of the same video with others. Furthermore, the barrage messaging function can be used on a browsing image also, so that the users may share their feelings with others while reviewing the same image. A better watching experience is provided this way.

However, if there are too many barrage messages, the content of the video would be covered by the barrage messages. Moreover, there may be unnecessary and irrelevant barrage messages for users. In both cases, some users may like to discontinue use of the barrage function. Therefore, it becomes important to make the barrage messages displayed more reasonably and relevantly.

SUMMARY

In general, example embodiments of the present disclosure provide an approach for displaying a barrage message. Specifically, one or more objects and location information for each object in a frame of a video are identified. A barrage message to be displayed in the frame of the video is obtained. The barrage message is displayed without covering any object in the frame.

One aspect of the present invention includes a computer-implemented method for displaying a barrage message, comprising: identifying one or more objects in a frame of a video; determining a location information related to each of the one or more objects; obtaining the barrage message to be displayed in the frame of the video; and displaying the barrage message without covering the one or more objects in the frame.

Another aspect of the present invention includes a computer program product for displaying a barrage message, and program instructions stored on the computer readable storage device, to: identify one or more objects in a frame of a video; determine a location information related to each of the one or more objects; obtain the barrage message to be displayed in the frame of the video; and display the barrage message without covering the one or more objects in the frame.

Yet another aspect of the present invention includes a computer system for displaying a barrage message, the computer system comprising: a memory medium comprising program instructions; a bus coupled to the memory medium; and a processor for executing the program instructions, the instructions causing the system to: identify one or more objects in a frame of a video; determine a location information related to each of the one or more objects; obtain the barrage message to be displayed in the frame of the video; and display the barrage message without covering the one or more objects in the frame.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
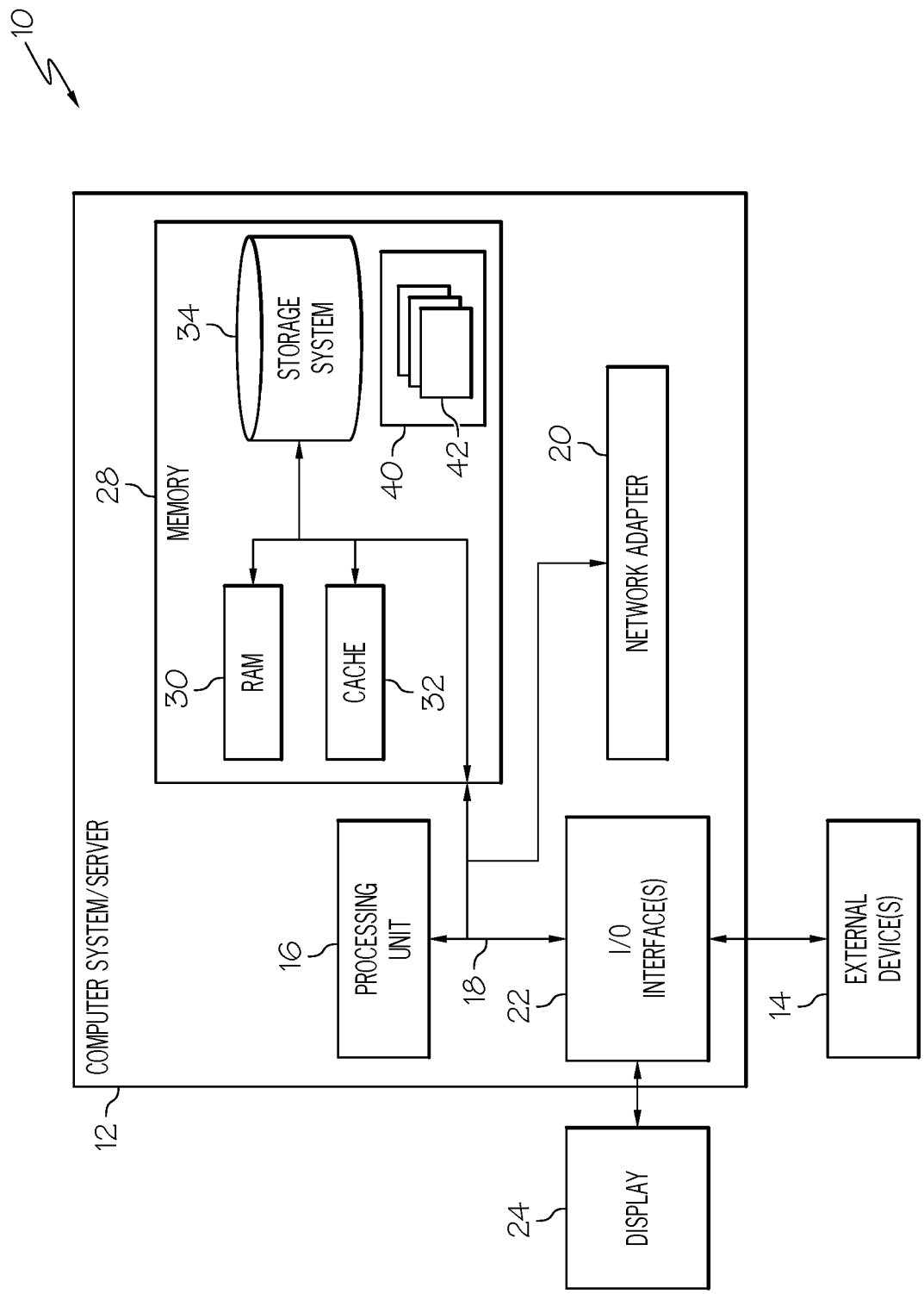
FIG. 1 is a block diagram of an electronic device suitable for implementing embodiments of the present invention.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes"

and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing", "detecting", "determining", "evaluating", "receiving", or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission, or viewing devices. The embodiments are not limited in this context.

As stated above, embodiments of the present invention provide approaches for displaying a barrage message. Specifically, one or more objects and location information for each object in a frame of a video are identified. A barrage message to be displayed in the frame of the video is obtained. The barrage message is displayed without covering any object in the frame.

Reference is first made to FIG. 1, in which an exemplary electronic device or computer system/server 12 which is applicable to implement the embodiments of the present disclosure is shown. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device or system. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components may be used in conjunction with computer system/server 12. Examples, include, but are not limited to: microcode, device drivers, redundant processing units, external disk drive arrays, RAID systems, tape drives, and data archival storage systems, and the like.

In computer system/server 12, I/O interfaces 22 may support one or more of various different input devices that can be used to provide input to computer system/server 12. For example, an input device may include a user device such keyboard, keypad, touch pad, trackball, and the like. An input device may implement one or more natural user interface techniques, such as speech recognition, touch and stylus recognition, recognition of gestures in contact with the input device and adjacent to the input device, recognition of air gestures, head and eye tracking, voice and speech recognition, sensing user brain activity, and machine intelligence. It is appreciated that the computer system/server 12 as illustrated in FIG. 1 is only an example of the computing device in which the embodiments of the present disclosure may be implemented. In one embodiment, the embodiments of the present disclosure may be implemented in a distributed computing system, for example, in a cloud computing environment.

It is appreciated that the computer system/server 12 as illustrated in FIG. 1 is only an example of the computing device in which the embodiments of the present disclosure may be implemented. The embodiments of the present disclosure may be implemented in other computing device or computing system.

It is to be understood that the description of barrage message processing is provided for the purpose of illustration to help those of ordinary skill in the art to understand and implement the present invention, without suggesting any limitations as to the scope of the invention. This disclosure also may be used for image/webpage barrage message processing, etc. It will not depart from the scope and spirit of the described embodiments.

Figure 2:
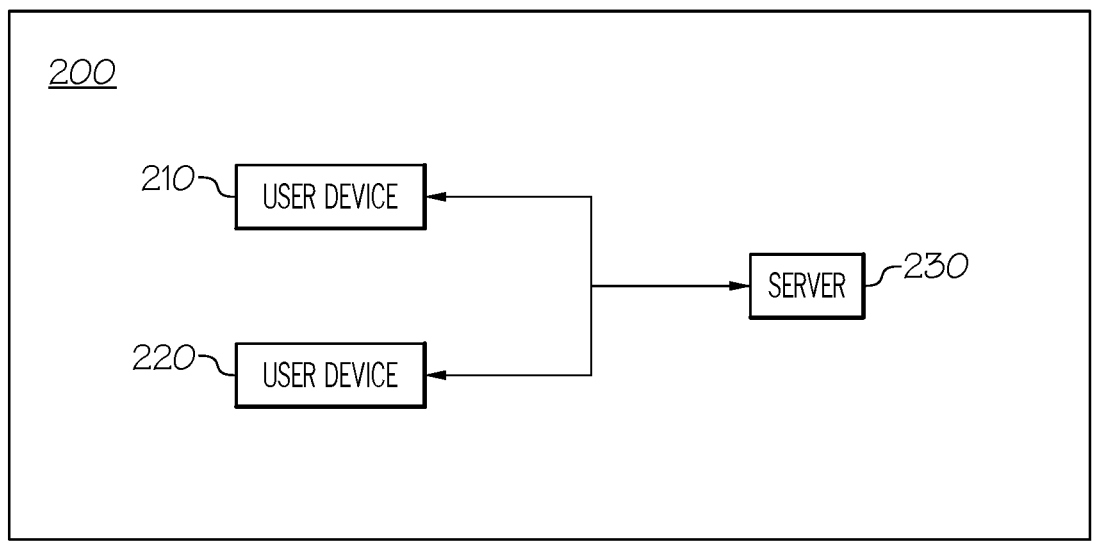
FIG. 2 is a block diagram of an environment where embodiments of the present invention can be implemented.

Exemplary embodiments of the present disclosure will be described in detail below. FIG. 2 shows a schematic block diagram of an environment 200 in which the exemplary embodiments of the present disclosure may be implemented. The environment 200 comprises a first user device 210, a second user device 220, and a server 230. Each of the user devices 210 and 220 may be any appropriate electronic device, examples of which include, but not limited to, one or more of the following: a desk computer, a portable computer, a tablet computer, a personal digital assistant (PDA), a cellular phone, a smart phone, and the like. The server 230 may store video, a picture, or a webpage which includes an image and/or video. In an embodiment, the server 230 may be a cloud server. The server 230 may be implemented using any appropriate computer/server (e.g., the computer/server 12 described above with the reference to FIG. 1).

Referring again to FIG. 2, the server 230 may provide access to the user device 210 or 220. The communication medium between user devices 210 and 220 and server 230 includes, but is not limited to, network connections such as the Internet, wide area network, local area network, metropolitan area network, and the like; telecommunication networks such as 2G, 3G, 4G telecommunication networks; near-field communications such as infrared, Bluetooth, and the like.

Figure 3:
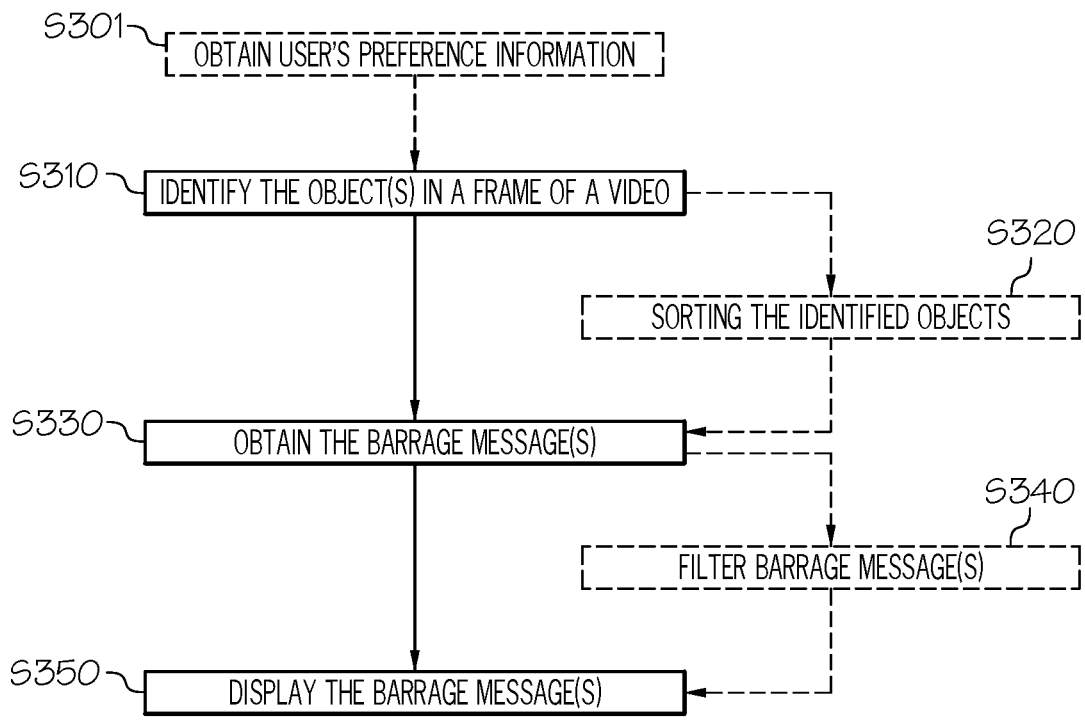
FIG. 3 is a flowchart of a method for processing barrage messages in accordance with embodiments of the present invention.

FIG. 3 shows a flowchart of a method 300 for processing barrage messages in accordance with an exemplary embodiment of the present invention. As described herein, the method 300 may be implemented by the server 230 for processing barrage messages and then send the processed barrage messages together with the corresponding video/image to the user device (210, 220) for displaying. Alternatively, the method 300 may be implemented by the user device (210, 220) which gets barrage messages together with the corresponding video/image then processes the barrage messages for display.

As shown, the method 300 comprises step S301, in which user's preference information is obtained. In one embodiment, a user's profile is used to record the user's preference information. Optionally, the content of the user's profile may be input by the user himself/herself or may be generated either based on the user-related information collected by the server 230/user device 210 or 220, or the information collected from the user-related social network account(s). In one embodiment, NLP (Natural Language Processing) is used in collecting information. Specifically, step S301 may be implemented by existing NLP technologies (e.g., semantic analysis). Semantic analysis is a technology for analyzing web pages to get the descriptive keywords which are related to the predefined topic. A user's profile is used to record information associated with the user (for example, it may comprise an item about the user's favorite actor).

The following is an example of user's profile.

TABLE 1

| User Name | Favorite Actor | Favorite Character | Favorite Movie Type | Favorite Movie(s) |
|---|---|---|---|---|
| Annie | Angela Hu | Lily | Comedy | I Love Movies |

It is to be understood that the example above is for purposes of illustration and is not intended to be exhaustive or limited to the embodiments disclosed. It will be apparent to those of ordinary skill in the art to set any other information items as they need. It won't depart from the scope and spirit of the described embodiments.

In another implementation, a user's preference information may be determined by using a camera to capture the user's visual focus when the user is watching the video. In one implementation, the eye-tracking technology may be used to capture the user's visual focus. An eye tracker is a device for measuring eye positions and eye movement. It should be understood that any other suitable ways, either currently known or to be developed in the future, can be applied to determine the user's visual focus. It is to be understood that step S301 is an optional step which can be omitted if the user's information is not required in the method 300.

Figure 6A:
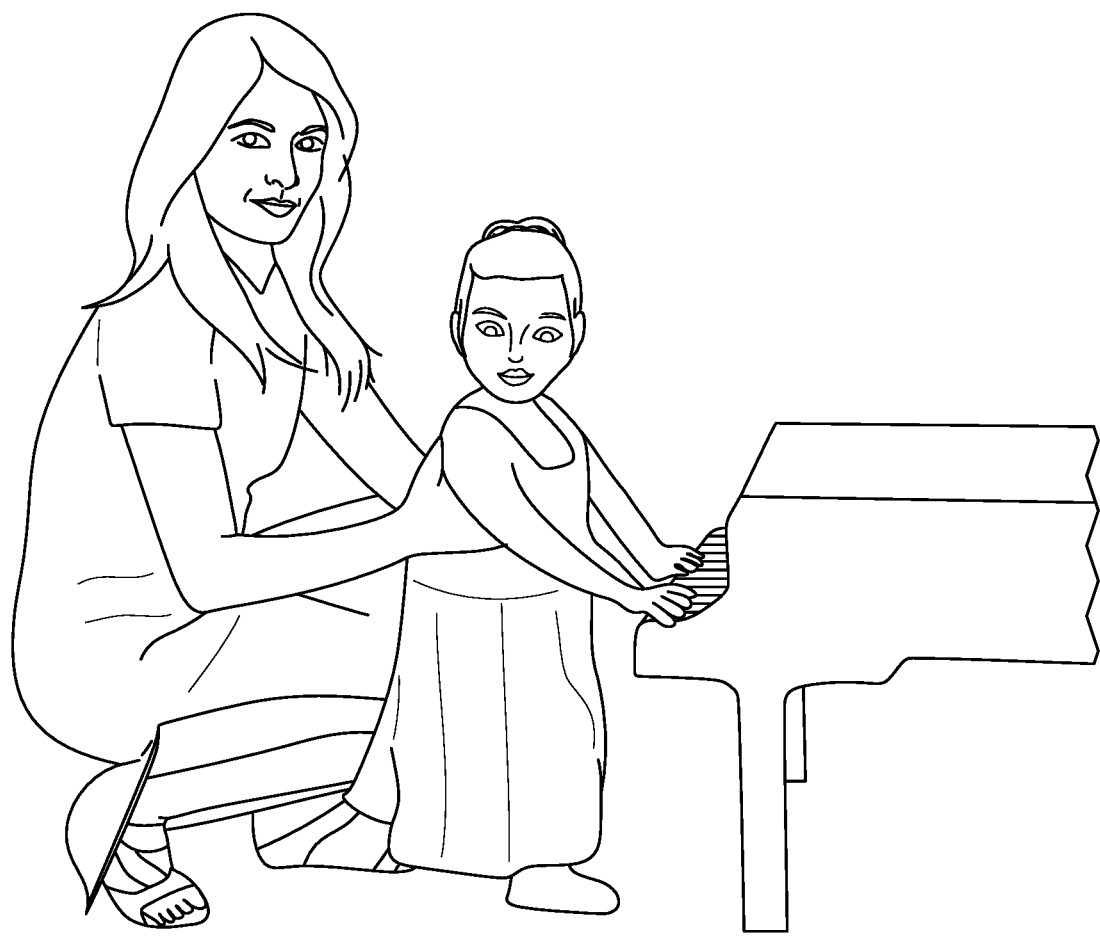
FIG. 6A shows an example of an original frame of a video/an image in accordance with embodiments of the present invention.
Figure 6B:
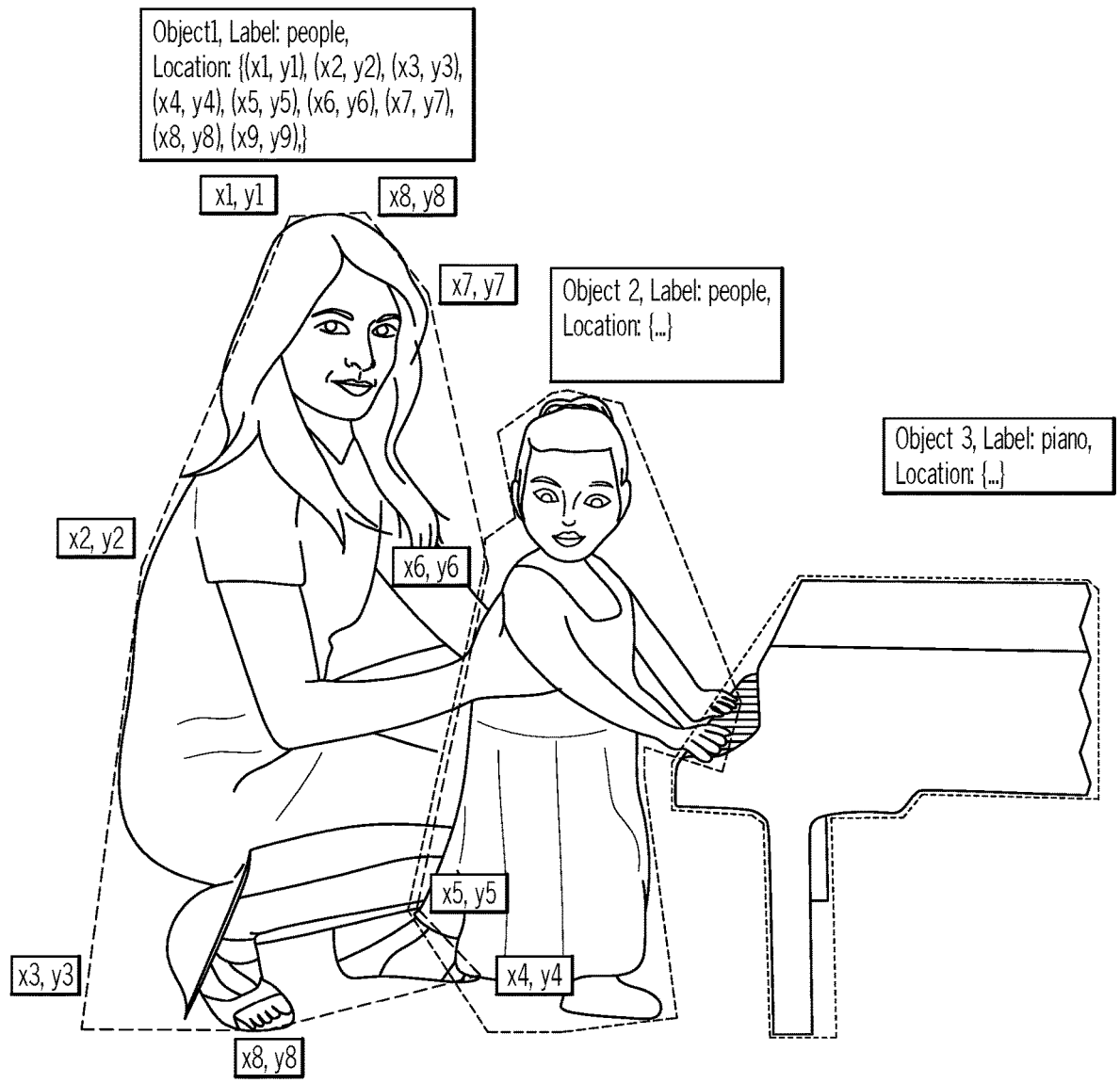
FIG. 6B shows an example of identified objects of the original frame of a video (the image in FIG. 6A) in accordance with embodiments of the present invention.

Then in step S310, one or more objects in a frame of a video or an image are identified. It is to be understood that processing for a frame of a video illustrated herein is just for the purpose of explanation, since the video usually comprises a plurality of frames which may be processed one by one in the same way. In one example, step S310 may be implemented by using existing object recognition technology in the field of image processing. For example, the object recognition technology may be used for identifying each object in an image or a frame. An example of object recognition technology comprises: a recognition module is trained with database including known objects and corresponding labels of the known objects as input first; then the image to be identified is input into the recognition module which may be one or more output objects to be identified included in the image and their labels which shows the object's attribute. Each object in the output may be marked with a location in the original image (for example the boundary of the object is marked). The outputted label corresponding to the object is used to indicate what the object is, such as people, plano, table, etc. By way of example, if the object in an image is a cat, the label may be "cat", if the object in an image is a person, the label may be "people". In an embodiment of this invention, one or more of the following appearance-based methods may be used to implement step S310: Edge Matching, Divide-and-Conquer Search, Greyscale Matching, or the like. In another embodiment of present invention, one or more of the following feature-based methods may be used to implement step S310: Interpretation Trees, Hypothesize and Test, Pose Consistency, Pose Clustering, or the like. After recognizing each object's location and/or its label, the information of the object's location and/or its label would be stored as the object's metadata. FIG. 6A shows an example of an original frame of a video (i.e., an image), and FIG. 6B shows an example of identified objects for the original frame of video in FIG. 6A. For the purpose of protecting privacy, the faces of the objects are blurred. The label and location information are determined together with each object itself and saved as the object's metadata. In one embodiment, the object's location is identified by cross-ordinate of each point on the object's contour. It is to be understood that FIG. 6B only shows a sketch of the objects. In fact, the contour may be smoother and closer to the object with more points. FIG. 6B shows the metadata of the objects which may be saved separately or with the image. The detailed information related to object1 shown in FIG. 6B is for the purpose of explanation. Location and label information for other objects may also be obtained.

In one embodiment, a user pays attention to each character of a video, such as in a film or TV series. So preferably, one or more character objects may be identified from the identified objects. The term "character" refers to an entity having a role in the video. For example, for a normal movie, the person in the movie is a character, while for a cartoon, a cartoon animal may be the character. The term "character object" refers to the object which is a character in the video or identified as a character by the user. Preferably, step S310 further comprises steps of identifying a character object and its information.

Figure 4:
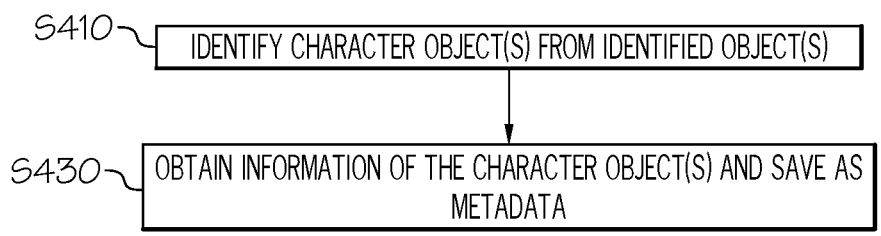
FIG. 4 is a flowchart of a method for obtaining information of character object(s) in accordance with embodiments of the present invention.
Figure 5:
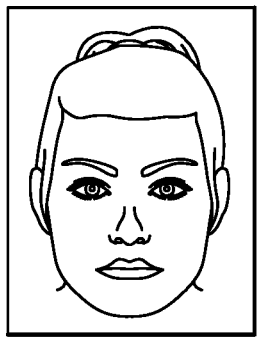
FIG. 5 shows an example of an actor list related to FIG. 6A-FIG. 6C in accordance with embodiments of the present invention.
Figure 5:
Figure 5:

Referring now to FIG. 4, a flowchart of a method for obtaining information of a character object in accordance with embodiments of the present disclosure is shown. In step S410, a character object is identified from any number of identified objects. In one embodiment, an object is determined as a character object of the video by the user. For example, object1 and object2 in FIG. 6B may be determined as character objects by the user directly. In another embodiment, the label of an object is used to identify a character object. In this embodiment, a label of a character of the video is first obtained. As mentioned before, the label of a character may be input by the user or obtained by object recognition technology. The label of each identified object is then used to compare with the label of the characters of the video/image. Each object with the matched label is identified as a character object. For example, the label of characters in FIG. 5 is obtained as "people". The labels of object1 and object2 in FIG. 6B are obtained as "people". These two objects are identified as character objects of the video. Since the label of object3 is "plano", the object 3 won't be identified as a character object.

Referring back to FIG. 4, in step S430, information of each character object is obtained and saved as metadata. For example, information of object1 and object2 shown in FIG. 6B are obtained. In one embodiment, the information comprises character name and/or actor name. Here, face recognition technology may be used which compares each object with the original character data, such as an actor list or poster comprising actors' photos and corresponding character/actor name, to identify every object's character name and/or actor's name. Then, the character name and/or the actor's name is obtained and saved as the object's metadata. By way of example, the image of object1 in FIG. 6B is found to match one photo in the actor list shown in FIG. 5. The actor name (Rachael Li) and the character name (Carol) corresponding to this photo would be saved as the metadata of object1.

In one embodiment, topical crawler and/or semantic analysis technology are used to get additional information about the actor based on the object's character/actor name. Then, all or part of the object's information can be saved as the object's metadata. By way of example, in FIG. 6B, for the object2's actor name as "Angela Hu", topical crawler and semantic analysis technology can be used to find that Hu starred in another movie named "I Love Movies," so "I Love Movies" may also be saved as metadata of object2. Topical crawler is a technology for collecting web pages whose topic is the same as predefined ones. It is to be understood that the topical crawler and semantic analysis technology are just examples, as similar technologies known by those of ordinary skill in the art may be used to obtain the information related to character objects.

In another alternative embodiment, step S310 further comprises step S320 of sorting identified objects for a frame of a video. For the purpose of explanation, the following description is about sorting identified objects, but it is to be understood that step S320 may be used to sort the identified objects or the identified character objects, depending on the user's choice or the need of implementation. Furthermore, the objects may be sorted based on background data. In one embodiment, the background data is the data input by the user. In other words, sorting may be based on user input.

In another embodiment, the background data comprises information corresponding to the identified objects. For example, the information may comprise original character data for a character object. All objects are compared with the original character data, such as an actor list or poster comprising actors' photos. The sorting in the actor list is used to generate the sorting of the objects, so that it is consistent with the sorting of the original character data. By way of example, for the objects in FIG. 6B, object1 would be ranked first, and object 2 would be ranked second through a comparison with the actor list shown in FIG. 5.

In yet another embodiment, the background data comprises search volume data from the Internet related to the identified object (i.e., the object with higher search volume data has a higher rank). In yet another embodiment, the background data comprises a size of the identified objects. Under this circumstance, the size of each identified object is obtained. All objects are then sorted according to their size (i.e., the object with larger size is ranked higher). In yet another embodiment, the objects may be sorted based on any combination of the methods described above. Preferably, different weighting may be assigned to different kinds of background data. The sorting would then be determined based on the combination of more than one type of background data with different weighting.

In yet another embodiment, the background data comprises the user's preference information recorded in the user's profile. The preference information is compared with the metadata of all identified objects. The rank of the matched object would be set the highest. For example, in FIG. 6B, the actor name "Angela Hu" in the object2's metadata is found to match the user's favorite actor through comparing the object's metadata with the user's profile, then the rank of object2 is set to first. The rest of the objects are sorted based on any one or the combination of the ways described above.

In yet another embodiment, the background data comprises a specific identified object which is a visual focus of the user. The rank of the specific identified object is set the highest with the rest of the objects sorted based on any one or a combination of the above ways. If there is more than one object obtaining the user's visual focus, the sort may be determined by the duration of focus, etc. It is to be understood that any suitable technology, either currently known or to be developed in the future, can be applied to get a user's visual focus. It is also to be understood that the actor list or the poster is just an example. Other profile information which contains the actor's photo, basic information and rank may also be used.

Referring back to FIG. 3, at step S330, any number of barrage messages is obtained. It is to be understood that any suitable technology, either currently known or to be developed in the future, can be applied to obtain barrage messages. In one optional embodiment, a step S340 of filtering barrage messages is further included. For example, a threshold N may be set. The filtering will not be executed if the number of barrage messages does not exceed the threshold N. Then all received barrage messages would be displayed. Otherwise, the filtering would be executed.

The threshold N may either be set by the user or generated by server S230/user device 210 or 220 based on how the number of previous barrage messages impact display on a screen. Optionally, the barrage messages to be displayed may be the first N received messages or selected randomly. Preferably, a barrage message would not be filtered out if it matches the metadata of any object in the frame to be displayed. For example, if the recognized keyword "Carol" for a barrage message "Carol wears makeup today" matches an object's metadata "Carol", then the barrage message would be retained and displayed. Preferably, a barrage message related to an object with a lower rank in sorting is filtered out in response to a number of the barrage messages exceeding the defined threshold. Preferably, a barrage message which does not match a user's preference would be filtered out based on the user's profile. For example, if, according to the user profile, the user's favorite actor is Rachael Li, then a negative barrage message about actor Rachael Li would be filtered out. Optionally, if a user's visual focus usually shows his/her interested object(s), then a barrage message irrelevant to the object(s) would be filtered out. Preferably, a barrage message may be filtered out based on the combination of the above rules.

Although step S310 is executed after step S301, and step S330 is executed after step S310 in FIG. 3, it is to be noted that the execution sequences of the steps S301, S310, and S330 are not limited thereto, but may be arbitrary. It is also possible to execute step S330 prior to step S310 and/or step S310 prior to the S301, and it is also possible to execute steps S310 and S301, S330 and S310 substantially in parallel. Without explicit definition of a sequence, the steps defined in the claims should not be interpreted with limitation of any specific sequence.

After identifying the objects and obtaining the barrage messages, in step S350, the barrage messages are displayed in the video without covering the objects. There are various ways of displaying barrage messages. In one embodiment, a barrage message is drawn frame by frame so that the barrage message is shown on the video after being drawn. In another embodiment, an interface is used to define a barrage message's initial location and survival time so that the barrage message would be displayed as a predefined configuration during the predefined survival time. The detailed description is not provided here since these two ways of displaying barrage messages are well known by those of ordinary skill in the art.

In one embodiment, a barrage message in scope of an object's location is set to be transparent. In another embodiment, the barrage message is displayed by bypassing the scope of the object's location. In another embodiment, the barrage message is displayed by destroying the barrage message in the scope of the object's location. In yet another embodiment, a new barrage message with the same content of the destroyed one is generated in another location which is not in the scope of the object's location.

Figure 6C:
FIG. 6C shows an example of the frame of a video (the image in FIG. 6A with the processed barrage messages) in accordance with embodiments of the present invention.

Optionally, a barrage message related to one or more certain objects would be displayed nearby the objects. It is to be understood if the barrage message is not related to any object, it may be displayed without covering any object. If a barrage message is related to more than one object, in one embodiment, it may be displayed nearby the object with higher rank. In another embodiment, it may be displayed nearby the object which matches the user's preference. Preferably, when there are too many barrage messages, the object ranked first would not be covered in priority, and so on. In another embodiment, for the purpose of better interaction, preferably one or more objects may be covered by a picture (i.e., an image) or pictures based on the topic of the barrage message. In one embodiment, a picture database is further provided in which every picture has metadata comprising one or more related keywords. For example, a picture of a mouth in the database has metadata to record the keyword "mouth" and "kiss". And the keyword "Lily" and "kiss" are determined in a barrage message "Want to kiss Lily, she is so cute!" since the keyword "Lily" is found to match the metadata of object2, and the keyword "kiss" is found to match the metadata of a picture of a mouth in the picture DB. Then, as shown in FIG. 6C, the face of object2 is covered by a picture of a mouth from the picture database. In another embodiment, the picture to cover the object may be obtained from the Internet. In this way, audiences may have more interaction and fun during using a barrage function. It is to be noted that the duration of covering by a picture may be a predefined duration (e.g., 5 seconds), in another way, the covering may be stopped by the user.

In an embodiment of the present invention, a pre-processing solution may be adopted. In the pre-processing solution, step S310 may be performed to deal with the video which is stored in server 230. Steps 330 through 350 would be performed later in response to a user opening a barrage function or a user request to start this method/system. Upon adoption of the pre-processing solution, pre-processing of the video may be initiated in response to uploading of the video or in response to the idle status of the server. It may also be initiated periodically. By using the pre-processing solution, the processed video may be prepared before receiving a user request, which may efficiently utilize the idle status of the server to complete the steps of video processing and reduce system pressure when a user starts this method/system. And when facing requests from plurality users of the same video, the pre-processing solution is able to perform above the processing steps only once.

In another embodiment of the present invention, a real-time processing solution may be adopted. In the real-time processing solution, in response to a user starting a barrage function or requesting to start this system/method, processing of a video or barrage message is performed. That is, the method 300 as shown in FIG. 3 is performed on the server 230 or on the user device 210 or 220. By using the real-time processing solution, the video of a live show may be processed, and it is possible that only the video needed to be processed is processed. By way of example, for a video in which no user requests to open a barrage function, no processing needs to be performed, so that the real-time processing solution may avoid the processing of this kind of video and may not need to occupy memory space to store the result of processing. It is to be understood that when the real-time processing solution is adopted on the server 230, for each frame in a video, the step S310 is only processed once and then the processed result is stored. When another user who is watching the same video requests to start this system/method or opens the barrage function, there is no need to perform step S310 again, and the processed video may be obtained directly from memory.

It is to be understood that the pre-processing solution may be implemented by the server 230, or other servers, which is not limited by this invention. Similarly, a processed video with identified objects and related metadata may be stored in the server 230, or other servers. Identified objects and related metadata may be stored separately or together. In addition, in processing a video, object recognition and NLP may be implemented by different servers.

In an embodiment of the present invention, an initiation mechanism for the methods described in above embodiments is provided. By way of example, a switch may be set for a user. When the switch is on, any barrage message related to the video that the user is watching may be processed by said methods. When the switch is off, barrage messages will not be processed and will be presented on the video without using the methods in the above embodiments.

In an embodiment of the present invention, the above initiate mechanism is to be initiated in at least one of step S301, S310, and step S330.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for barrage message processing. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for barrage message processing. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network (for example, the Internet, a local area network, a wide area network and/or a wireless network). The network may comprise copper transmission cables, optical transmission fibers, wireless transmission, routers, firewalls, switches, gateway computers and/or edge servers. A network adapter card or network interface in each computing/processing device receives computer readable program instructions from the network and routes the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an document of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

It is apparent that there has been provided herein approaches for barrage message processing. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

We claim:

1. A computer-implemented method for displaying a barrage message, comprising:
    tracking a visual focus of a user as the user is consuming a video;
    identifying an object in a frame of the video that is a subject of the visual focus of the user;
    obtaining a plurality of barrage messages that are related to the subject of the visual focus of the user;
    ranking each of the plurality of barrage messages based on at least one item selected from the group consisting of a degree of relevance to the object and a set of user preferences in a user profile;
    selecting, from among the plurality of barrage messages, the barrage message to be displayed in the frame of the video of the user based on the ranking;
    displaying the barrage message in a non-obscuring display location within the frame of the video; and
    selecting at least one lower ranked barrage message, for which display to the user does not occur, based on the ranking and a number of non-obscuring barrage messages that can be displayed in the frame of the video.

2. The computer-implemented method of claim 1, further comprising identifying a character object from among the one or more objects, obtaining information of the character object, and saving the information as metadata.

3. The computer-implemented method of claim 1, further comprising sorting the one or more objects of the frame of the video based on background data.

4. The computer-implemented method of claim 3, wherein the background data is selected from a group consisting of data input by a user, information related to each of the one or more objects, search volume data related to each of the one or more objects, a size related to each of the one or more objects, a user preference, and a visual focus of a user.

5. The computer-implemented method of claim 1, further comprising determining an object corresponding to the barrage message and displaying the barrage message nearby the corresponding object.

6. The computer-implemented method of claim 1, further comprising determining a topic related to the barrage message and displaying a picture related to the topic.

7. A computer program product for displaying a barrage message, the computer program product being stored on a computer readable storage device and including program instructions that cause at least one computer device to:
    track a visual focus of a user as the user is consuming a video;
    identifying an object in a frame of the video that is a subject of the visual focus of the user;
    obtain a plurality of barrage messages that are related to the subject of the visual focus of the user;
    rank each of the plurality of barrage messages based on at least one of a degree of relevance to the objects and a set of user preferences in a user profile;
    select, from among the plurality of barrage messages, the barrage message to be displayed in the frame of the video of the user based on the ranking;

display the barrage message in a non-obscuring display location within the frame of the video; and select at least one lower ranked barrage message, for which display to the user does not occur, based on the ranking and a number of non-obscuring barrage messages that can be displayed in the frame of the video.

8. The computing program product of claim 7, further comprising program instructions to identify a character object from among the one or more objects, obtain information of the character object, and save the information as metadata.

9. The computing program product of claim 7, further comprising program instructions to sort the one or more objects of the frame of the video based on background data.

10. The computing program product of claim 9, wherein the background data is selected from a group consisting of information related to each of the one or more objects, search volume data related to each of the one or more objects, a size related to each of the one or more objects, a set of user preferences recorded in a user profile, and a visual focus of a user.

11. The computing program product of claim 7, further comprising program instructions to determine an object corresponding to the barrage message and display the barrage message nearby the corresponding object such that a display of the lower ranked barrage message to the specific user does not occur.

12. The computing program product of claim 7, further comprising program instructions to set the barrage message in a scope of the object's location to be transparent, display the barrage message by bypassing the scope of the object's location, and destroy the barrage message in the scope of the object's location.

13. A computer system for displaying a barrage message, the computer system comprising:
   a memory medium comprising program instructions;
   a bus coupled to the memory medium; and
   a processor for executing the program instructions, the instructions causing the system to:
   track a visual focus of a user as the user is consuming a video;
   identify an object in a frame of the video that is a subject of the visual focus of the user;
   obtain a plurality of barrage messages that are related to the subject of the visual focus of the user;
   rank each of the plurality of barrage messages based on at least one of a degree of relevance to the objects and a set of user preferences in a user profile;
   select, from among the plurality of barrage messages, the barrage message to be displayed in the frame of the video of the user based on the ranking;
   display the barrage message in a non-obscuring display location within the frame of the video; and
   select at least one lower ranked barrage message, for which display to the user does not occur, based on the ranking and a number of non-obscuring barrage messages that can be displayed in the frame of the video.

14. The computer system of claim 13, further comprising program instructions to identify a character object from among the one or more objects, obtain information of the character object, and save the information as metadata.

15. The computer system of claim 13, further comprising program instructions to sort the one or more objects of the frame of the video based on background data.

16. The computer system of claim 15, wherein the background data is selected from a group consisting of data input by user, information related to each of the one or more objects, search volume data related to each of the one or more objects, a size related to each of the one or more objects, a user preference, and a visual focus of a user.

17. The computer system of claim 13, further comprising program instructions to determine an object corresponding to the barrage message and display the barrage message nearby the corresponding object.

* * * * *